(12) United States Patent
Pisklak et al.

(10) Patent No.: US 8,796,188 B2
(45) Date of Patent: Aug. 5, 2014

(54) LIGHT-WEIGHT PROPPANT FROM HEAT-TREATED PUMICE

(75) Inventors: Thomas J. Pisklak, Cypress, TX (US); Richard F. Stevens, Jr., Sugar Land, TX (US); Qi Qu, Spring, TX (US); Elizabeth G. Morillo, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 662 days.

(21) Appl. No.: 12/619,828

(22) Filed: Nov. 17, 2009

(65) Prior Publication Data

US 2011/0118155 A1 May 19, 2011

(51) Int. Cl.
| | | |
|---|---|---|
| C09K 8/528 | (2006.01) | |
| C09K 8/74 | (2006.01) | |
| B29C 67/00 | (2006.01) | |
| B05D 7/00 | (2006.01) | |
| C09K 8/80 | (2006.01) | |
| C04B 26/02 | (2006.01) | |
| C04B 20/10 | (2006.01) | |

(52) U.S. Cl.
CPC ............... C09K 8/805 (2013.01); C04B 26/02 (2013.01); C04B 20/1074 (2013.01)
USPC ............ 507/274; 507/269; 264/117; 427/215

(58) Field of Classification Search
CPC ............ C09K 8/528; C09K 8/72; C09K 8/80; C09K 8/46; C09K 8/805; C23F 11/184
USPC ............ 507/274, 269, 117; 264/117; 427/215
See application file for complete search history.

(56) References Cited

U.S. PATENT DOCUMENTS

| | | |
|---|---|---|
| 3,933,205 A | 1/1976 | Kiel |
| 3,965,982 A | 6/1976 | Medlin |
| 4,007,792 A | 2/1977 | Meister |
| 4,067,389 A | 1/1978 | Savins |
| 4,199,484 A | 4/1980 | Murphey |
| 4,378,845 A | 4/1983 | Medlin et al. |
| 4,427,068 A | 1/1984 | Fitzgibbon |
| 4,479,041 A | 10/1984 | Fenwick et al. |
| 4,541,935 A | 9/1985 | Constien et al. |
| 4,549,608 A | 10/1985 | Stowe et al. |
| 4,623,021 A | 11/1986 | Stowe |
| 4,657,081 A | 4/1987 | Hodge |
| 4,660,643 A | 4/1987 | Perkins |
| 4,680,230 A | 7/1987 | Gibb et al. |
| 4,705,113 A | 11/1987 | Perkins |
| 4,714,115 A | 12/1987 | Uhri |
| 4,718,490 A | 1/1988 | Uhri |
| 4,724,905 A | 2/1988 | Uhri |
| 4,739,834 A | 4/1988 | Peiffer et al. |
| 4,779,680 A | 10/1988 | Sydansk |
| 4,817,717 A | 4/1989 | Jennings, Jr. et al. |
| 4,830,106 A | 5/1989 | Uhri |
| 4,846,277 A | 7/1989 | Khalil et al. |
| 4,848,468 A | 7/1989 | Hazlett et al. |
| 4,852,650 A | 8/1989 | Jennings et al. |
| 4,869,322 A | 9/1989 | Vogt, Jr. et al. |
| 4,892,147 A | 1/1990 | Jennings, Jr. et al. |
| 4,926,940 A | 5/1990 | Stromswold |
| 4,938,286 A | 7/1990 | Jennings, Jr. |
| 5,005,645 A | 4/1991 | Jennings, Jr. et al. |
| 5,024,276 A | 6/1991 | Borchardt |
| 5,074,359 A | 12/1991 | Schmidt |
| 5,128,390 A | 7/1992 | Murphey et al. |
| 5,228,510 A | 7/1993 | Jennings, Jr. et al. |
| 5,363,919 A | 11/1994 | Jennings, Jr. |
| 5,402,846 A | 4/1995 | Jennings, Jr. et al. |
| 5,411,091 A | 5/1995 | Jennings, Jr. |
| 5,472,049 A | 12/1995 | Chaffee et al. |
| 5,482,116 A | 1/1996 | El-Rabaa et al. |
| 5,488,083 A | 1/1996 | Kinsey, III et al. |
| 5,497,831 A | 3/1996 | Hainey et al. |
| 5,551,516 A | 9/1996 | Norman et al. |
| 5,604,184 A | 2/1997 | Ellis et al. |
| 5,711,396 A | 1/1998 | Joerg et al. |
| 5,722,490 A | 3/1998 | Ebinger |
| 5,755,286 A | 5/1998 | Ebinger |
| 5,924,488 A | 7/1999 | Nguyen et al. |
| 5,955,144 A | 9/1999 | Sinclair et al. |
| 6,016,871 A | 1/2000 | Burts, Jr. |
| 6,079,492 A | 6/2000 | Hoogteijling et al. |
| 6,123,394 A | 9/2000 | Jeffrey |
| 6,135,205 A | 10/2000 | Phillips |
| 6,169,058 B1 | 1/2001 | Le et al. |
| 6,749,025 B1 | 6/2004 | Brannon et al. |
| 7,160,844 B2 | 1/2007 | Urbanek |
| 7,426,961 B2 | 9/2008 | Stephenson et al. |
| 7,494,711 B2 | 2/2009 | Kaufman et al. |
| 2004/0040708 A1 | 3/2004 | Stephenson et al. |
| 2005/0028979 A1 | 2/2005 | Brannon et al. |
| 2006/0016598 A1 | 1/2006 | Urbanek |
| 2006/0258546 A1 | 11/2006 | Brannon et al. |
| 2008/0261837 A1 * | 10/2008 | Usova et al. ............... 507/264 |

OTHER PUBLICATIONS

"Recommended Practices for Testing High Strength Proppants Used in Hydraulic Fracturing Operations", API Recommended Practice 60 (Rp 60), First Edition, Feb. 1, 1989. (7 pages).

Santra, Ashok, et al., "Green Proppant Systems From Locally Available, Low-Cost Materials", 2009 SPE Production and Operations Symposium, Apr. 4-8, 2009, Oklahoma City, OK, USA (10 pages).

* cited by examiner

*Primary Examiner* — Bijan Ahvazi
*Assistant Examiner* — Atnaf Admasu
(74) *Attorney, Agent, or Firm* — McGlinchey Stafford; R. Andrew Patty, II

(57) ABSTRACT

A process for forming a strong, low-density proppant, which process includes heating pumice particulates, or shaped agglomerates thereof, so as to form heat-treated pumice particulates, or heat-treated, shaped pumice agglomerates, having an apparent density of 2.4 or less and a crush resistance of no more than 10% fines at 4000 psi. Proppants, and well treatment fluids comprising proppants, meeting these characteristics and processes for treating subterranean formations using fluids which include such proppants are also described.

33 Claims, No Drawings

LIGHT-WEIGHT PROPPANT FROM HEAT-TREATED PUMICE

TECHNICAL FIELD

This invention relates to proppant materials useful in hydraulic fracturing of oil and gas wells and methods for manufacturing proppant materials.

BACKGROUND

Well stimulation involves the treatment of natural gas or oil wells via various methods to increase the productivity of the wells. One method used to stimulate wells is hydraulic fracturing. In hydraulic fracturing a fracturing fluid is pumped into the well at a higher pressure than the natural reservoir pressure. This causes the subterranean formation to crack, or fracture. If left unsupported the fracture would close, due to the surrounding formation pressure, once the higher pressure was removed. To prevent closure of the fracture, proppants are deposited in the fracture before the higher pressure is removed. Proppants are typically composed of materials such as sand, glass beads, polymers, walnut shells, porous ceramics, and dense ceramics.

In the past inorganic materials have often been utilized as a parting agent in the proppant formation process. The parting agents are used to enhance the separation of the green proppants after formation and to prevent them from agglomerating or sticking to the kiln during heat treatment. Generally, in these processes the inorganic material is not substantially different than the substrate material used to form the proppant, and in some cases are the same material (see, e.g., U.S. Pat. No. 4,427,068). However, there are some standard parting agents in use which are used irrespective of the proppant substrate material such as zircon, talc, silica, and alumina and are typically used in the amounts of 5 to 40 weight % of the dry proppant material (see, e.g., U.S. Pat. No. 4,680,230). The only consideration given to the selection of parting agents is that they do not interfere with the proppant formation and that they are unaffected by the heat treatment.

There are four major parameters associated with proppants and these are cost, density, strength, and heat resistance. All four parameters must be considered when choosing the best proppant to suit individual well properties. Typically, the highest strength and highest heat resistant proppants also have the highest density. The highest strength and temperature resistant proppants are made from bauxite, a fully dense ceramic, but unfortunately they also have the highest apparent density (~3.6 g/cc) and high cost. Sand is attractive as proppant because of its low cost, however it has a lower strength and temperature resistance than bauxite and a relatively high density. (~2.7 g/cc). Other proppants, such as polymer based proppants, walnut shells, and porous ceramics have low densities (~1.08, 1.25, and 2.08 g/cc, respectively), but also have lower strengths and poor heat resistance.

Thus, there continues to be a long-felt need for a proppant which is lightweight, economical, high in strength, and highly temperature resistance.

SUMMARY OF THE INVENTION

The current invention meets this need, amongst others, by providing for the formation of high strength, high temperature resistant, economical, and low density proppants from pumice or inorganically coated pumice. Thus, in one aspect of this invention there is provided a process for forming a proppant. The process comprises heating an amount of pumice particulates so as to form an amount of heat-treated, pumice particulates having an apparent density of 2.4 or less, and a crush resistance of no more than 10% fines at 4000 psi, thereby forming the proppant. As used herein, unless otherwise required in context, the phrase "an amount" when used with respect to a substance or material simply means a detectable quantity of the referenced substance or material capable of having the characteristics specified, if any, with respect to the substance or material.

In another aspect, this invention provides a process comprising agglomerating and shaping an amount of pumice particulates so as to form an amount of shaped pumice agglomerates, and heating the shaped pumice agglomerates so as to form an amount of heat-treated, shaped pumice agglomerates having an apparent density of 2.4 or less, and a crush resistance of no more than 10% fines at 4000 psi. Without being bound to theory, it is believed the heat-treated agglomerates actually transform during heat-treatment so that the pumice particulates within each agglomerate at least in part become essentially fused together. It should be understood that the heat-treated pumice agglomerates referenced throughout this disclosure, including the appended claims, are no longer mere agglomerated pumice particles easily separated from one another, but instead are, in effect, a substantially unitary body or macro-particle formed by the heat-induced fusion of the pumice particulates within each agglomerate.

The current invention also relates to the use of an inorganic coating to specifically enhance the physiochemical properties of the proppant substrate material (i.e., the heat-treated pumice agglomerates) to produce a more robust proppant. This, in another aspect of the invention, the process further comprises coating the heat-treated, shaped pumice agglomerates with a coating.

In yet another aspect of the invention there is provided a process for forming a proppant, the process comprising agglomerating and shaping an amount of pumice particulates so as to form an amount of shaped pumice agglomerates; coating the shaped pumice agglomerates with an inorganic coating to form coated agglomerates, and then heating the coated agglomerates so as to form an amount of heat-treated, shaped pumice agglomerates having an apparent density of 2.4 or less, and a crush resistance of no more than 10% fines at 4000 psi.

Another aspect of this invention is the heat treatment of individual pumice particles for forming a proppant. The individual particles then may be coated in the same manner as the shaped pumice agglomerates.

Still another aspect of this invention is a proppant comprised of shaped pumice agglomerates coated with an inorganic coating and characterized at least by having an apparent density of 2.4 or less, and a crush resistance of no more than 10% fines at 4000 psi.

Other aspects of the invention include a well treatment fluid comprising a carrier fluid and a proppant in accordance with the invention, and a process comprising treating a subterranean formation with such a well treatment fluid.

These and still further aspects, features and advantages of this invention shall become further apparent from the following detailed description and appended claims.

FURTHER DETAILED DESCRIPTION OF THE INVENTION

Pumice is a textural term describing a group of siliceous materials that are formed from lava. As used herein, the term pumice refers to and includes natural pumice, reticulite and scoria, or a mixture of any two or more of the foregoing.

Natural pumice is a lightweight, highly microvesicular form of igneous rock with a typical apparent density as low as 0.64 g/cc and 90% porosity. Natural pumice is formed during a volcanic eruption when molten lava is subjected to an abrupt change in pressure. The gas trapped in the lava expands and forms bubbles. The gas bubbles cause the lava to foam, and when this foam cools rapidly, natural pumice is formed. Natural pumice is typically composed of 50 to 80% $SiO_2$, and due to rapid cooling, has a glassy, non-crystalline structure. Reticulite is a type of pumice formed from basaltic magma, but unlike natural pumice, most of the microvesicles burst during the formation process, forming a honeycomb like structure. Scoria forms from the crust floating on basaltic or andesitic lava. Scoria cools at a slower rate than typical natural pumice and is, consequently, crystalline and more dense.

Natural pumice has a very low density but also low strength. In one aspect of the invention, to increase the strength of the pumice, it is subjected to heat treatment. The pumice so treated is particulate, with typical particle size range being from about 10 mesh to about 100 mesh, but preferably from about 20 mesh to about 70 mesh. The heat treatment causes the thin microvesicular walls of the pumice to flow and form thicker, stronger walls, which results in a stronger particle. Although the heat treatment increases the strength of the pumice particles, it also increases the density. However, the relationship of density to strength is controllable through the duration and temperature of the heating process.

Typically, the strength of proppants is measured by their resistance to crushing under applied stress. Crush tests are performed following the guidelines of the standard API crush resistance test (API Recommended Practice 60 (RP 60), 1st Ed., Feb. 1, 1989). In this test, a standard volume of proppant particles is placed in a cylindrical cell with a plunger on one end. A desired amount of pressure is applied to the cell to compress the particles. After compression, the particles are removed and sieved (using the lowest mesh size of the original particles) and any particles which pass through the mesh are collected (as "fines"). The percent fines are then calculated as a weight percentage of the initial weight of the proppant (% fines).

The crush resistance of a particle is not only dependant upon the inherent strength of the particle but also upon several other factors, such as, the particle's sphericity, roundness, fracture toughness, elastic modulus, surface roughness, particle packing properties, etc. Ideally, to efficiently resist crushing, the proppant should be spherically shaped, round, and tough.

In addition to heat treating individual pumice particles, shaped pumice agglomerates may be formed from pumice particulates with an average particle size up to about 150 microns. A typical heat treatment of either the pumice particles or the shaped, agglomerated pumice particulates involves heating the raw, untreated pumice of a suitable size at temperature in the range of about 1050 to about 1400° C. The heat treatment may be done in the presence of any suitable atmosphere. The heating ramp rate, if any, and the duration of heat treatment at the treatment temperature(s) will vary depending upon the heating method employed. If heating the untreated pumice from ambient temperature to the treatment temperature in a muffle furnace, for example, a typical heating ramp rate can be in the range of about 5 to about 20° C./minute, and then maintaining the pumice in an atmosphere which is at the treatment temperature for a period of time in range of about 5 minutes to about 4 hours, to form treated pumice particles or agglomerates. The treated particles or treated agglomerates of particles obtained will preferably exhibit apparent densities of at most 2.4 g/cc and increased strength. As is known to those skilled in the art, there is an inverse relationship between heating time and heating temperature, commonly referred to as heat-work. Typically, there is a certain amount of heat-work required to ensure the proper formation of a ceramic particle, but the conditions to attain that amount of heat-work are variable and are not necessarily limited to one specific set of conditions. For example, heat treated pumice particles have been formed at a heating rate of 8° C./minute with a maximum temperature of 1200° C. for 20 minutes which exhibit the same properties as those treated at 10° C./minute with a maximum temperature of 1100° C. for 3 hrs.

Traditionally, to ensure that the agglomerates retain the desired shape after formation and before heat treatment, the particles are bound together with organic binders. Organic binders, when used to form the pumice particle agglomerates, may vary. Examples of suitable organic binders include sodium carboxymethyl cellulose, starch, polyvinyl alcohol, gum arabic, lignosulfonates, molasses, dextrins, poly vinyl pyrrolidone, acrylics, polyethyleneimine, methyl cellulose, hydroxypropylmethyl cellulose, hydroxyethyl cellulose, sodium alginate, polyacrylamide, xanthan gum, guar gum and the like. To form spheres from pumice powder (also referred to herein as pumice particulates), the amount of organic binder can be from about 0.0 to about 10% of the weight of the dry pumice powder, and more preferably between about 0.20 to about 2.0% of the weight of the dry pumice powder.

Inorganic coatings for proppants of this invention are selected by their ability to enhance the properties which affect the performance of the proppant such as (but not limited to) crush resistance, fluid conductivity, acid resistance, elastic modulus, fracture toughness, and density. Usually, the coating which is chosen for a specific proppant exhibits contrasting properties to that of the substrate material. For example, the crush resistance of a hard, brittle proppant (low elastic modulus) can be enhanced by the selection of an inorganic coating which has a high elastic modulus (flexible). Other examples include, coating a lightweight proppant substrate with low fracture toughness with an inorganic coating of high fracture toughness, or a proppant substrate which dissolves easily in acid can be coated with an inorganic coating which is highly resistant to acids. Since the inorganic coatings are chosen to impart contrasting properties to those of the substrate, the inorganic coating is typically of substantially different chemical and/or morphological composition than that of the substrate. The selection of inorganic coatings is not limited to whether or not they will be affected by the heat treatment. Inorganic coatings are not limited to traditional ceramic materials such as (but not limited to) bentonite clay, kaolin clay, diasopore clay, burley clay, flint, ball clay, clays, boehmite, pseudo bohemite, alumina, cordierite, silicates (sodium, potassium, calcium, etc.), bauxite, zircon, zirconium oxide; but can include more advanced materials such as (but not limited to): polysilanes, polyorganosilanes, metal oxides, metal alkoxides, zeolites, mesoporous materials, nanoporous materials, aluminates (sodium, potassium, calcium, etc), phospates (sodium, potassium, calcium, etc), aluminum phosphates, aluminum phosphate molecular sieves, aluminosilicates, mesoporous and microporous aluminosilicates, aerogels, xerogels, silica aerogels, silica xerogels, alumina aerogels, alumina xerogels, carbides, nitrides, nanoparticles, nanotubes, and nanostructured materials. In addition, the inorganic coatings are not limited to a single material but may be mixtures of 2 or more materials and may be multiple layers of single materials or multiple layers of composite materials.

Bentonite may be preferred as the inorganic coating in certain applications because of its morphological properties (e.g., small crystallite size) which increases the sphericity and roundness of the pumice spheres and because of its chemical properties (e.g., fusion temperature) which reduce the density and increase the crush resistance of the pumice spheres. The pumice powder may have a relatively large particle size (e.g., <37 μm) and during sphere formation, the large particle size and angular shape of the particles, impart a high surface roughness to the spheres. This surface roughness increases particle to particle friction during the formation process which prevents the formation of highly spherical particles. The small particle size of the bentonite allows it to fill the voids between the larger pumice particles on the surface of the sphere and reduce particle to particle friction, therefore ensuring that more spherical particles are formed. The bentonite also effectively reduces the apparent specific gravity of the proppant particles while at the same time increases their crush resistance. Bentonite reduces the density of the particles through a scaffolding mechanism, where, during heating, the exterior layer of bentonite fuses and prevents, to some extent, the substrate from shrinking. This allows the same amount of material to occupy a larger volume, and effectively reduces the specific gravity of the particle.

Typically, once proppants have been coated with an inorganic coating an additional step is necessary to permanently adhere the coating to the proppant. This is usually achieved through a heat treatment or sintering. Heat treatment of the coated proppant will typically be carried out at one or more temperatures in the range of about 700 to about 1500° C. The heat treatment may be carried out after coating the agglomerates (or the particulates when no agglomerates are formed) but prior to any other treatment An example of other treatments would be a secondary coating which enhances the performance of the particles. Secondary coatings are typically organic compounds such as (but not limited to): epoxies, resins, or other organic polymers.

Typically these secondary coatings are applied through processes well known in the art. The following U.S. patents disclose various techniques for applying organic coatings employed in accordance with this invention with or without modifications, and their teachings are incorporated herein by reference: U.S. Pat. Nos. 7,494,711; 7,426,961; 6,749,025; 6,079,492; 5,955,144; 5,924,488; 5,604,184; 5,128,390; and 4,199,484.

In one aspect, this invention is directed towards a method of treating a subterranean formation with a well treatment fluid, the well treatment fluid comprising at least a carrier fluid and a proppant in accord with this invention. The following U.S. patents disclose various techniques for conducting hydraulic fracturing and appropriate carrier fluid(s) which may be employed in accordance with this invention with or without modifications, and their teachings are incorporated herein by reference: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The following examples are merely illustrative and should not be construed as limiting in any way the scope of the invention taught herein.

In the testing set out below, apparent density was determined according to the following protocol:

A small amount of proppant ($W_P$) was weighed out using a standard lab scale. The weight of the proppant was recorded. The proppant was then mixed with a minimal amount of Loctite Professional 2 part epoxy and formed into a cohesive mass. The epoxy was allowed to cure for 4 hours. The epoxy coated proppant was then re-weighed, and $W_P$ was subtracted to give the total weight of epoxy used ($W_E$). After weighing, the sample was placed in a MICROMETRICS ACCUPYC 1330 gas pycnometer, using helium as the working gas. The pycnometer volume analysis program was then initiated and the volume of the sample was measured five times. The five volumes were averaged to give the total volume of the proppant and epoxy ($V_{PE}$).

Next, the density of the epoxy alone was determined ($V_E$). A small sample of cured epoxy was placed in the pycnometer and the average volume was obtained. The weight of the epoxy sample was then divided by the average volume of the epoxy to give a density ($D_E$) of 1.20 g/cc.

The following equations were then used to determine the final density of the proppants ($D_P$):

$$V_E = \frac{W_E}{D_E}$$

$$V_P = V_{PE} - V_E$$

$$D_P = \frac{W_P}{V_P}$$

where $V_E$ is the volume of epoxy, $W_E$ is the weight of epoxy, $D_E$ is the density of epoxy, $V_P$ is the volume of the uncoated proppant, $V_{PE}$ is the volume of epoxy coated proppant, $W_P$ is the weight of proppant, and $D_P$ is the density of proppant.

EXAMPLE 1

Pumice Particulates Heat Treatment

Raw, untreated pumice of a suitable size was heated to 1100° C. at a heating rate of 10° C./minute in air, and then treating at 1100° C. for 3 hrs to form particles with apparent densities of 1.9 g/cc and greatly increased strength.

To compare the strength of the particles, an INSTRON 3345 Load Frame was used in accordance with the manufacturer's suggested operating procedures to determine the maximum loading the particles could withstand before fracture (each loading is an average of the max loading of 20 particles) (Table 1).

TABLE 1

Strength and density data for heat treated pumice.

| Sample | Heat Treatment | Bulk Density (g/cc) | Apparent Density (g/cc) | Max. Load (lbs) |
|---|---|---|---|---|
| Pumice | — | 0.39 | 1.20 | 2.5 |
| P1000 | 1000° C., 3 hrs. | 0.70 | 1.60 | 3.2 |
| P1050 | 1050° C., 3 hrs. | 0.96 | 1.89 | 6 |
| P1075 | 1075° C., 3 hrs. | 1.02 | 1.86 | 6.8 |
| P1100 | 1100° C., 3 hrs. | 1.03 | 1.84 | 7.5 |
| Porous Ceramic | — | 1.22 | 2.08 | 6.1 |

As a comparative example, a typical, commercially available, porous ceramic proppant was also tested for maximum loading under the same conditions. As can be seen in Table 1, the heat treatment of pumice can be utilized to form a lighter, stronger proppant than conventional lightweight ceramic technology. The heat treated pumice (P1100) exhibits greater single particle strength than the conventional porous ceramics (Table 1); however, an improved bulk crush resistance is desirable (Table 2).

EXAMPLE 2

Formed, Treated Pumice

The raw pumice was formed into particles substantially spherical in shape prior to heat treatment to increase their crush resistance.

To obtain a pumice powder which would efficiently form spherical particles in the Eirich mixer, large (~1.2 mm diameter) pumice particles were lightly ground. The ground pumice was then sieved with a 400 mesh sieve to obtain a powder with particle sizes of less than 37 microns. Although particles of less than 37 microns are preferable, the formation technique is not necessarily limited by particle size. To ensure that the particles retained their spherical shape after formation and before heat treatment an organic binder was used. The binder used in this case was CMC (sodium carboxymethyl cellulose).

Prior to sphere formation a 1.0% CMC in water solution was prepared by dissolving 1.0 grams of CMC in 99.0 grams of deionized water. To form the spherical particles, 200.0 grams of <400 mesh pumice powder was placed in the pan of the lab scale version of an Eirich mixer. The CMC binder solution was added in two stages. Using and atomizer, 82.0 grams of the 1.0% CMC solution was sprayed onto the pumice powder while the pan was rotated at 74 rpm and the contra rotating impeller at 650 rpm. The binder and pumice powder was allowed to mix at this mixer setting for 2 minutes. The impeller speed was then increased to 1100 rpm and 7.0 grams of 1.0% CMC solution was sprayed onto the pumice powder. After all of the binder solution was added (37% by weight of dry pumice powder), the pumice powder was mixed for 5 minutes to form spheres. Next, to prevent the spheres from agglomerating, 40.0 grams of dry pumice was added to the pan as a parting agent and this was mixed for 1 minute. The spheres were then removed from the pan and sieved to the correct size.

The pumice spheres (PS) were dried at 100° C. overnight. They were then heated at a rate of 8° C./min to 1200° C. for 20 minutes. After heating the spheres were sized to between 20 and 40 mesh. The heat treated pumice spheres (PS) were crushed at 4000 and 6000 pounds per square inch (psi) pressure which generated 9.1% fines and 31.1% fines (Table 2), respectively.

TABLE 2

Crush resistance of pumice based proppants.

| Sample | Bulk Density (g/cc) | Apparent Density (g/cc) | % Fines @ 4000 psi | % Fines @ 6000 psi |
|---|---|---|---|---|
| P1100 | 1.03 | 1.84 | 43.8 | — |
| PS | 1.31 | 2.34 | 9.1 | 31.1 |
| CPS | 1.33 | 2.23 | 7.0 | 19.5 |
| Porous Ceramic | 1.22 | 2.08 | 11.7 | 24.9 |

When compared with non-spherical heat treated pumice particles (43.8% fines at 4000 psi) the spherical pumice exhibited greatly increased the crush resistance at both 4000 and 6000 psi. The spherical pumice also had higher crush resistance than the porous ceramic at 4000 psi (9.1 vs. 11.7% fines); however, at 6000 psi the porous ceramic generated only 24.9% fines while the spherical pumice generated 31.1% fines.

EXAMPLE 3

Inorganic Coating of Formed, Treated Pumice

In the case of heat treated spherical pumice, bentonite clay was chosen as the inorganic coating. Bentonite clay has an apparent specific gravity of 2.6 and is composed of crystallites which are 5 to 200 nanometers (nm) in size and has a chemical composition of $Al_2O_3 \cdot 4SiO_2 \cdot H_2O$. The pumice powder used as the proppant substrate had an apparent specific gravity of 1.2 and was composed of amorphous particles which are 1 to 37 microns in size and had a chemical composition of approximately 17% $Al_2O_3$, 72% $SiO_2$, 3.5% $Fe_2O_3$, 7.5% ($Na_2O$, $MgO$, $K_2O$, $CaO$).

To coat the spherical particles, the pumice powder was first formed into spherical particles using the lab scale version of an Eirich mixer and the method described above. To form the spherical particles, 200.0 grams of <400 mesh pumice powder was placed in the pan of the lab scale Eirich mixer. The CMC binder solution was added in two stages. Using and atomizer, 82.0 grams of the 1.0% CMC solution was sprayed onto the pumice powder while the pan was rotated at 74 rpm and the contra rotating impeller at 650 rpm. The binder and pumice powder was allowed to mix at this mixer setting for 2 minutes. The impeller speed was then increased to 1100 rpm and 7.0 grams of 1.0% CMC solution was sprayed onto the pumice powder. After all of the binder solution was added (37% by weight of dry pumice powder), the pumice powder was mixed for 5 minutes to form spheres. Next, to prevent the spheres from agglomerating, 40.0 grams of dry pumice was added to the pan as a parting agent and this was mixed for 1 minute. The impeller was then removed from the pan and the pan was rotated at 40 rpm. Bentonite clay was then slowly added, typically, in an amount between 50 and 200 weight % of the dry pumice spheres, but preferably at 120 weight %. The coated spheres were allowed to tumble in the mixing pan for 2 minutes to achieve a smooth, compact, uniform coating. The spheres were then removed from the pan and sieved to the correct size.

The coated pumice spheres (CPS) were dried at room temperature overnight. They were then heated at a rate of 8° C./min to 1200° C. for 20 minutes. After heating, the spheres were sized to between 20 and 40 mesh.

As seen in Table 2 above, the uncoated spherical pumice (PS) had an apparent specific gravity of 2.34 and the bentonite coated spherical pumice (CPS) had an apparent specific gravity of 2.23. The CPS also had a greater crush resistance at 4000 and 6000 psi (7.0 and 19.5% fines, respectively) than the porous ceramic (11.7 and 24.9% fines, respectively). Without being bound to theory, it is believed that the increased strength of the CPS was most likely due to the generation of high internal stresses from the shrinking differential between the bentonite and pumice. The induced stresses increase the strength of the particles through a mechanism similar to that of tempered glass.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

It should now be appreciated that embodiments of this invention can include, without limitation, at least the following:

A. A process for forming a proppant, the process comprising
heating an amount of pumice particulates so as to form an amount of heat-treated, pumice particulates having an apparent density of 2.4 or less, and a crush resistance of no more than 10% fines at 4000 psi.

B. The process according to A, wherein prior to heating, the pumice particulates are coated with an inorganic coating comprised of one or more components selected from the group consisting of bentonite clay, kaolin clay, diasopore clay, burley clay, flint, ball clay, clays, boehmite, pseudo bohemite, alumina, cordierite, sodium, potassium and calcium silicates, bauxite, zircon, zirconium oxide, polysilanes, polyorganosilanes, metal oxides, metal alkoxides, zeolites, mesoporous materials, nanoporous materials, sodium, potassium or calcium aluminates, sodium, potassium or calcium phosphates, aluminum phosphates, aluminum phosphate molecular sieves, aluminosilicates, mesoporous and microporous aluminosilicates, aerogels, xerogels, silica aerogels, silica xerogels, alumina aerogels, alumina xerogels, polysialates, carbides, nitrides, nanoparticles, nanotubes and nanostructured materials.

C. The process according to B, wherein the coating is an inorganic coating which comprises bentonite clay.

D. The process according to C, wherein the amount of bentonite clay is in the range of about 50 to 200 wt %, based on the weight of the shaped pumice agglomerates in dry form.

E. The process according to B, wherein the pumice particulates have an average particle size of greater than 150 microns.

F. The process according to E, wherein the heating step is conducted at a treatment temperature of at least 1050° C.

G. A process according to A, further comprising
agglomerating and shaping the amount of pumice particulates prior to heating, so as to form an amount of shaped pumice agglomerates;
wherein the step of heating is carried out with respect to the shaped pumice agglomerates, so as to form an amount of heat-treated, shaped pumice agglomerates having an apparent density of 2.4 or less, and a crush resistance of no more than 10% fines at 4000 psi.

H. The process according to G, wherein the agglomerating and shaping step is carried out by a process comprising contacting the pumice particles with a binder.

I. The process according to claims H, wherein the binder is an organic binder.

J. The process according to I, wherein the organic binder is comprised of one or more components selected from the group consisting of starch, polyvinyl alcohol, gum arabic, lignosulfonates, molasses, dextrins, poly vinyl pyrrolidone, acrylics, polyethyleneimine, a methyl cellulose, a hydroxypropylmethyl cellulose, a hydroxyethyl cellulose, sodium alginate, polyacrylamide, xanthan gum, and guar gum.

K. The process according to J, wherein the organic binder comprises sodium carboxymethyl cellulose.

L. The process according to I, wherein the amount of binder is no more than about 10 wt %, based on the weight of the pumice particulates in dry form.

M. The process according to G, wherein pumice particulates have an average particle size of no more than 150 microns.

N. The process according to any of claims G through M, further comprising coating the heat-treated, shaped pumice agglomerates with a coating.

O. The process according to N, wherein the coating is organic.

P. The process according to any of claims G to M, wherein the pumice particulates have a mean particle size distribution ($D_{50}$) of less than 200 microns.

Q. The process according to P, wherein the mean particle size distribution ($D_{50}$) is less than 100 microns.

R. A process for forming a proppant, the process comprising agglomerating and shaping an amount of pumice particulates so as to form an amount of shaped pumice agglomerates; coating the shaped pumice agglomerates with an inorganic coating to form coated agglomerates, and then heating the coated agglomerates so as to form an amount of heat-treated, shaped pumice agglomerates having an apparent density of 2.4 or less, and a crush resistance of no more than 10% fines at 4000 psi.

S. The process according to R, wherein the coating is an inorganic coating comprised of one or more components selected from the group consisting of bentonite clay, kaolin clay, diasopore clay, burley clay, flint, ball clay, clays, boehmite, pseudo bohemite, alumina, cordierite, sodium, potassium and calcium silicates, bauxite, zircon, zirconium oxide, polysilanes, polyorganosilanes, metal oxides, metal alkoxides, zeolites, mesoporous materials, nanoporous materials, sodium, potassium or calcium aluminates, sodium, potassium or calcium phosphates, aluminum phosphates, aluminum phosphate molecular sieves, aluminosilicates, mesoporous and microporous aluminosilicates, aerogels, xerogels, silica areogels, silica xerogels, alumina aerogels, alumina xerogels, polysialates, carbides, nitrides, nanoparticles, nanotubes and nanostructured materials.

T. The process according to S, wherein the coating is an inorganic coating which comprises bentonite clay.

U. The process according to T, wherein the amount of bentonite clay is in the range of about 50 to 200 wt %, based on the weight of the shaped pumice agglomerates in dry form.

V. The process according to U, wherein the heating step is conducted at a treatment temperature of at least 1050° C.

W. The process according to any of claims R to V, wherein the pumice particulates have a mean particle size distribution ($D_{50}$) of less than 200 microns.

X. The process according to W, wherein the mean particle size distribution ($D_{50}$) is less than 100 microns.

Y. A proppant formed by a process in accordance with any of the foregoing claims.

Z. A proppant comprised of shaped pumice agglomerates coated with an inorganic coating and characterized at least by having an apparent density of 2.4 or less, and a crush resistance of no more than 10% fines at 4000 psi.

AA. The proppant according to Z, wherein the inorganic coating is comprised of one or more components selected from the group consisting of bentonite clay, kaolin clay, diasopore clay, burley clay, flint, ball clay, clays, boehmite, pseudo bohemite, alumina, cordierite, sodium, potassium and calcium silicates, bauxite, zircon, zirconium oxide, polysilanes, polyorganosilanes, metal oxides, metal alkoxides, zeolites, mesoporous materials, nanoporous materials, sodium, potassium or calcium aluminates, sodium, potassium or calcium phosphates, aluminum phosphates, aluminum phosphate molecular sieves, aluminosilicates, mesoporous and microporous aluminosilicates, aerogels, xerogels, silica areogels, silica xerogels, alumina aerogels, alumina xerogels, polysialates, carbides, nitrides, nanoparticles, nanotubes and nanostructured materials.

BB. The proppant of AA, wherein the inorganic coating comprises bentonite clay.

CC. The proppant according to any of the foregoing claims Y through BB, wherein the shaped pumice agglomerates are substantially spherical in shape.

DD. A well treatment fluid comprising a carrier fluid and a proppant in accordance with any of claims Y through CC.

EE. A process comprising treating a subterranean formation with a well treatment fluid in accordance with DD.

Each and every patent or other publication or published document referred to in any portion of this specification is incorporated into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A process for forming a proppant, the process comprising
   heating an amount of pumice particulates coated with bentonite clay so as to (i) increase its density and maintain or shrink its size relative to the pre-heated pumice particulates and (ii) form an amount of heat-treated, pumice particulates having an apparent density of 2.4 or less, and a crush resistance of no more than 10% fines at 4000 psi;
   wherein the amount of bentonite clay is in the range of about 50 to 200 wt %, based on the weight of the shaped pumice agglomerates in dry form.

2. The process according to claim 1, wherein the pumice particulates have an average particle size of greater than 150 microns.

3. The process according to claim 1, wherein the heating step is conducted at a treatment temperature of at least 1050° C.

4. The process according to claim 1, further comprising coating the heat-treated particulates with a secondary organic coating.

5. A process according to claim 1, further comprising agglomerating and shaping the amount of pumice particulates prior to heating, so as to form an amount of shaped pumice agglomerates;
   wherein the step of heating is carried out with respect to the shaped pumice agglomerates, so as to form an amount of heat-treated, shaped pumice agglomerates having an apparent density of 2.4 or less, and a crush resistance of no more than 10% fines at 4000 psi.

6. The process according to claim 5, wherein the agglomerating and shaping step is carried out by a process comprising contacting the pumice particles with a binder.

7. The process according to claim 6, wherein the binder is an organic binder.

8. The process according to claim 7, wherein the organic binder is comprised of one or more components selected from the group consisting of starch, polyvinyl alcohol, gum arabic, lignosulfonates, molasses, dextrins, poly vinyl pyrrolidone, acrylics, polyethyleneimine, a methyl cellulose, a hydroxypropylmethyl cellulose, a hydroxyethyl cellulose, sodium alginate, polyacrylamide, xanthan gum, and guar gum.

9. The process according to claim 8, wherein the organic binder comprises sodium carboxymethyl cellulose.

10. The process according to claim 7, wherein the amount of binder is no more than about 10 wt %, based on the weight of the pumice particulates in dry form.

11. The process according to claim 5, wherein pumice particulates have an average particle size of no more than 150 microns.

12. The process according to any one of claims 5 to 11, further comprising coating the heat-treated, shaped pumice agglomerates with either an inorganic coating or an organic coating, or both.

13. The process according to any one of claims 2 to 11, wherein the pumice particulates have a mean particle size distribution ($D_{50}$) of less than 200 microns.

14. A process for forming a proppant, the process comprising agglomerating and shaping an amount of pumice particulates so as to form an amount of shaped pumice agglomerates; coating the shaped pumice agglomerates with bentonite clay, wherein the amount of bentonite clay is in the range of about 50 to 200 wt %, based on the weight of the shaped pumice agglomerates in dry form, to form coated agglomerates, and then heating the coated agglomerates so as to (i) increase the density and to maintain or shrink the size of the pumice particulates relative to pre-heating and (ii) to form an amount of heat-treated, shaped pumice agglomerates having an apparent density of 2.4 or less, and a crush resistance of no more than 10% fines at 4000 psi.

15. The process according to claim 14, wherein the heating step is conducted at a treatment temperature of at least 1050° C.

16. The process according to claim 14, further comprising coating the heat-treated, coated agglomerates with a secondary organic coating.

17. The process according to claim 14, wherein the pumice particulates have a mean particle size distribution ($D_{50}$) of less than 200 microns.

18. A proppant formed by a process in accordance with claim 1.

19. A process comprising treating a subterranean formation with a well treatment fluid comprising a proppant formed by a process in accordance with claim 1.

20. The process according to claim 19, wherein the pumice particulates have an average particle size of greater than 150 microns.

21. The process according to claim 19, wherein the heating step is conducted at a treatment temperature of at least 1050° C.

22. The process according to claim 19, further comprising coating the heat-treated particulates with a secondary organic coating.

23. The process according to claim 19, further comprising agglomerating and shaping the amount of pumice particulates prior to heating, so as to form an amount of shaped pumice agglomerates;
wherein the step of heating is carried out with respect to the shaped pumice agglomerates, so as to form an amount of heat-treated, shaped pumice agglomerates having an apparent density of 2.4 or less, and a crush resistance of no more than 10% fines at 4000 psi.

24. The process according to claim 23, wherein the agglomerating and shaping step is carried out by a process comprising contacting the pumice particles with a binder.

25. The process according to claim 24, wherein the binder is an organic binder.

26. The process according to claim 25, wherein the organic binder is comprised of one or more components selected from the group consisting of starch, polyvinyl alcohol, gum arabic, lignosulfonates, molasses, dextrins, poly vinyl pyrrolidone, acrylics, polyethyleneimine, a methyl cellulose, a hydroxypropylmethyl cellulose, a hydroxyethyl cellulose, sodium alginate, polyacrylamide, xanthan gum, and guar gum.

27. The process according to claim 26, wherein the organic binder comprises sodium carboxymethyl cellulose.

28. The process according to claim 25, wherein the amount of binder is no more than about 10 wt %, based on the weight of the pumice particulates in dry form.

29. The process according to claim 23, wherein pumice particulates have an average particle size of no more than 150 microns.

30. The process according to claim 29, further comprising coating the heat-treated, shaped pumice agglomerates with either an inorganic coating or an organic coating, or both.

31. The process according to claim 23, further comprising coating the heat-treated, shaped pumice agglomerates with either an inorganic coating or an organic coating, or both.

32. The process according to claim 20, wherein the pumice particulates have a mean particle size distribution ($D_{50}$) of less than 200 microns.

33. The process according to claim 29, wherein the pumice particulates have a mean particle size distribution ($D_{50}$) of less than 200 microns.

* * * * *